US005321883A

United States Patent [19]

Klappert et al.

[11] Patent Number: 5,321,883

[45] Date of Patent: Jun. 21, 1994

[54] APPARATUS FOR MAKING A TRANSFORMER CORE COMPRISING STRIPS OF AMORPHOUS STELL WRAPPED AROUND THE CORE WINDOW

[75] Inventors: Willi Klappert; David R. Freeman, both of Hickory, N.C.

[73] Assignee: General Electric Company, Schenectady, N.Y.

[21] Appl. No.: 963,779

[22] Filed: Oct. 20, 1992

[51] Int. Cl.[5] .................... B23P 19/04; H01F 3/04; B21C 47/02

[52] U.S. Cl. .................... 29/729; 29/602.1; 29/605; 72/147

[58] Field of Search .................... 29/602.1, 605, 606, 29/609, 738, 564.6, 564.8, 564.5, 729, 759, 820; 72/147, 148; 336/212, 213, 216, 217, 234; 242/7.06, 7.07, 7.09, 7.14, 7.15,

[56] References Cited

U.S. PATENT DOCUMENTS

| | | | |
|---|---|---|---|
| 3,049,793 | 8/1962 | Cooper | 29/155.57 |
| 4,467,632 | 8/1984 | Klappert | 72/147 |
| 4,734,975 | 4/1988 | Ballard et al. | 29/606 |
| 4,741,096 | 5/1988 | Lee et al. | 29/605 |
| 5,050,294 | 9/1991 | Ballard et al. | 29/609 |
| 5,093,981 | 3/1992 | Ballard et al. | 29/609 |
| 5,230,139 | 7/1993 | Klappert et al. | 29/564.6 |

FOREIGN PATENT DOCUMENTS

| | | | |
|---|---|---|---|
| 59-18624 | 1/1984 | Japan | 29/609 |
| 120010 | 6/1987 | Japan | 29/609 |
| 538081 | 7/1941 | United Kingdom | 29/606 |

*Primary Examiner*—Peter Dungba Vo

*Attorney, Agent, or Firm*—William Freedman

[57] ABSTRACT

This wrapping apparatus comprises a belt nester for wrapping stacks of thin amorphous steel strips about an arbor. The belt nester includes (a) a belt wrapped about the arbor and movable along its length to impart rotary motion to the arbor and (b) means for successively feeding individual ones of the stacks into the space between the belt and the arbor. The wrapping apparatus further comprises means defining a first substantially-flat surface upon which the stacks are supported as they are fed into the space between the belt and the arbor and additional means defining a second substantially-flat surface extending parallel to the first flat surface. Control means operates when a stack that is being wrapped on the arbor passes between said flat surfaces to bias one of the flat surfaces toward the other and to compress the stack between the two flat surfaces as the stack is wrapped. This compression removes wrinkles from the strips, removes air pockets from between the strips, and enables the stack to be more effectively guided by guide members at the longitudinal edges of the stack.

20 Claims, 7 Drawing Sheets

APPARATUS FOR MAKING A TRANSFORMER CORE COMPRISING STRIPS OF AMORPHOUS STELL WRAPPED AROUND THE CORE WINDOW

CROSS-REFERENCE TO RELATED PATENTS AND APPLICATIONS

This invention is related to the subject matter disclosed and claimed in the following patents and patent applications.

U.S. Pat. No. 5,093,981—Ballard & Klappert
U.S. Pat. No. 5,050,294—Ballard & Klappert
U.S. Pat. No. 4,734,975—Ballard & Klappert
U.S. Pat. No. 4,741,096—Lee & Ballard
Application Ser. No. 07/623,265—Klappert and Houser, filed Dec. 9, 1990, as a continuation of application Ser. No. 07/535,538 filed Jun. 11, 1990.

All of these patents and patent applications are incorporated by reference in the present application.

TECHNICAL FIELD

This invention relates to apparatus for making a core for an electric transformer that comprises a plurality of strips of amorphous steel wrapped in superposed relationship about the window of the core and, more particularly, relates to apparatus of this type that employs a belt nester for wrapping stacks of such strips about a rotatable arbor that is rotated as the stacks are wrapped thereabout.

BACKGROUND

A type of core-making machine that has been used for many years for making transformer cores is the belt nester. Typically, a belt nester comprises a rotatable arbor about which sections of magnetic strip steel of controlled length are wrapped in superposed relationship as the arbor is rotated, thereby building up a core form that increases in diameter as additional strips are wrapped about those previously wrapped. Wrapping of the strips is effected by use of a flexible belt that encircles the arbor and is driven to cause rotation of the arbor and any strips previously wrapped about the arbor. Strips are fed into the belt nester in such a manner that they enter between the arbor and the encircling belt; and as the belt and arbor move together, each entering strip, or group of strips, is forced by the belt to tightly encircle the arbor or any core form already built up upon the arbor. An example of a belt nester of this type is disclosed in U.S. Pat. No. 3,049,793—Cooper.

Belt nesters of the above type have heretofore been used for making cores that comprise strips of amorphous steel that are wrapped about the rotating arbor. Because the amorphous strips are very thin (e.g., typically only about 1 mil in thickness), it is highly desirable to feed them into the belt nester in stacks, each comprising a large number of the strips. Each of these stacks is preferably a packet comprising a plurality of groups of strips, each group comprising many strips stacked in superposed relationship, the groups being stacked in longitudinally-staggered relationship. An example of such apparatus is shown and claimed in the above-referred to application Ser. No. 07/623,265—Klappert and Houser.

While the apparatus disclosed in the Klappert and Houser application performs quite satisfactorily for making amorphous steel transformer cores of moderate diameters, e.g., up to about 22 inches, some problems have been encountered in using such apparatus for making cores of larger diameters. More specifically, when such apparatus is used for making cores of larger diameters, telescoping of the turns of the core becomes a difficult-to-manage problem. The term "telescoping" as used herein, denotes displacement or shifting, of the trailing edges of the stack in a lateral direction with respect to the leading edge during the wrapping-about-the-arbor operation. This telescoping action, as it applies to silicon-steel transformer core manufacturing, is described in greater detail in U.S. Pat. No. 4,476,632—Klappert, assigned to the assignee of the present invention. Telescoping can also be a problem in the manufacture of cores made from groups or packets of amorphous steel strip wrapped about an arbor.

An object of our invention is to provide simple and effective means for reducing the tendency of the groups or packets of amorphous metal strip to telescope as they are being wrapped about the arbor of a belt-nesting machine, especially in the case of the very long groups or packets that are wrapped about the arbor to form the outer turns of a large diameter core. To provide a better appreciation of this problem, it is noted that the outer packet of a 35 inch diameter core is about 124 inches long, and it is typically made up of several hundred thin strips of amorphous steel.

It is quite difficult to prevent such a long packet from telescoping and sustaining damage during transfer to the arbor and subsequent belt nesting. We are concerned with preventing the amorphous strip in packets of this type from being damaged by such telescoping.

Another object is to wrap the very thin amorphous metal strips in such a manner that there is a reduced tendency for the strips to develop undesirable wrinkles during wrapping and also a reduced tendency for air pockets to develop between the strips during wrapping.

SUMMARY

In carrying out our invention in one form, we provide for wrapping stacks of thin amorphous steel strips about the window of a transformer core wrapping apparatus that comprises (a) an arbor located where the window is to be located, (b) a belt wrapped about the arbor and movable along its length for imparting rotary motion to the arbor; and (c) means for successively feeding individual ones of the stacks into the space between the belt and the arbor for successively causing said individual stacks to be wrapped about the arbor as the belt is driven along its length. The wrapping apparatus further comprises means defining a first substantially flat surface upon which said stacks are supported as they are fed into the space between the belt and the arbor and additional means defining a second substantially flat surface extending substantially parallel to said first flat surface. Control means operates when a stack that is being wrapped on the arbor passes between said substantially flat surfaces to bias one of the flat surfaces toward the other and to compress the stack between said two flat surfaces as the stack is wrapped. This compression action removes wrinkles from the strips in the region of the stack between the two flat surfaces and also removes air pockets from between the strips in said region. In addition, the compression action enables the stack to be more effectively guided during wrapping by guide members located along the longitudinal edges of the stack, thus reducing the tendency of the stack to telescope during wrapping.

BRIEF DESCRIPTION OF FIGURES

For a better understanding of the invention, reference may be had to the following description taken in connection with the accompanying drawings, wherein.

DETAILED DESCRIPTION OF EMBODIMENTS

THE PACKETS

Figure 1:
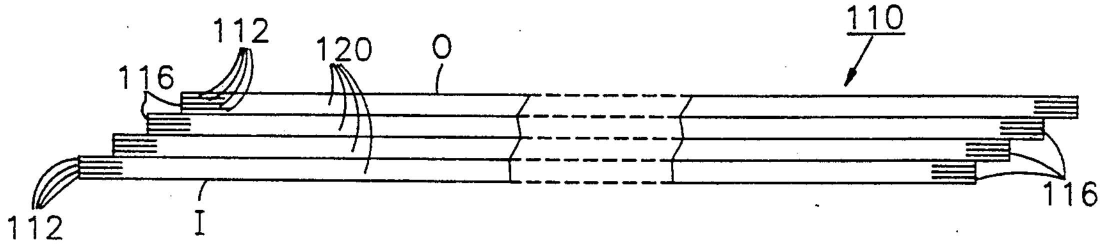
FIG. 1 is an enlarged side elevational view of a packet of amorphous steel strips representative of many such packets that are used by our apparatus for manufacturing cores.
Figure 2:
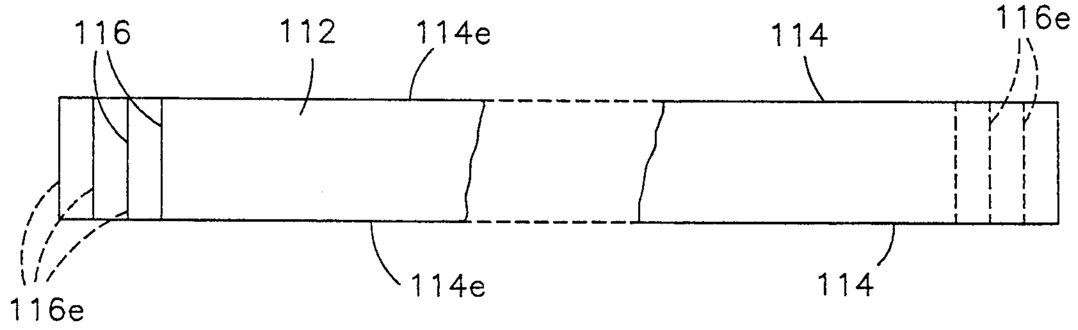
FIG. 2 is a view of the packet shown in FIG. 1.

Referring first to FIGS. 1 and 2, there is shown a packet 110 that is representative of a large number of packets that are used by our apparatus for constructing a transformer core. The packet of FIGS. 1 and 2 is formed from many superposed elongated strips 112 of amorphous steel, each having a thickness of only about 1 mil, which is very small in comparison to the 7 to 12 mils typical of the thickness of the grain-oriented silicon steel that is most commonly used for distribution transformer cores. Each strip comprises two lateral edges 114 extending along its length and transversely-extending edges 116 at opposite ends of the strip. The superposed strips are arranged in groups 120 each comprising a large number of strips, e.g., 10 to 36. In each group, the lateral edges 114 of the strips at each side of the strips are substantially aligned, and the transversely-extending edges 116 of the strips at each end of the strips are nearly aligned. The packets and groups are sometimes referred to herein by the more general term "stacks".

Packet 110 comprises a plurality of superposed groups 120 of strips. In each packet, the lateral edges 114*e* of all the groups are substantially aligned but the transversely-extending edges 116*e* of the groups at the ends of the packet are staggered with respect to each other longitudinally of the packet. Within each packet, the ends of successive groups, considered from the inside I to the outside O of the packet, overlap at one end of the packet and underlap at the opposite end of the packet. All the packets used in a given transformer core are preferably of the same basic construction and the same width, but the packets (assembled for being successively wrapped about the window of the core) are made of progressively increasing length to accommodate the increasingly greater circumference of the core form as it is built up by the successive wrapping of packets about its outer periphery.

THE BELT NESTER

Figure 4:
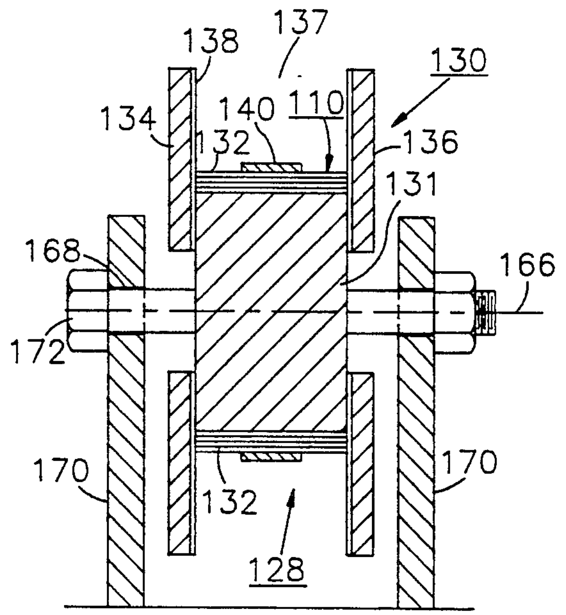
FIG. 4 is a sectional view along the line 4—4 of FIG. 3.
Figure 3:
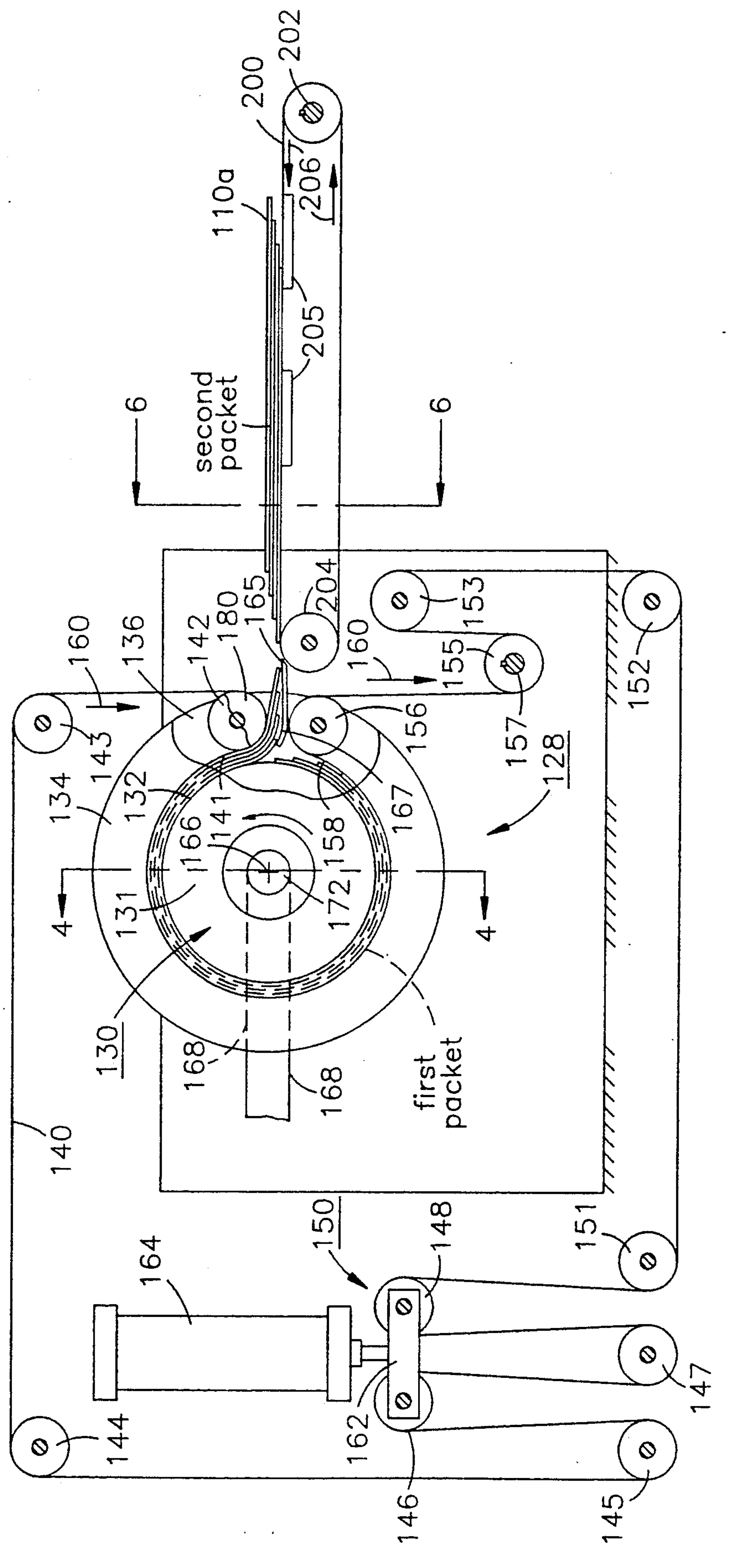
FIG. 3 is a partially schematic side elevational view of a belt nester used for building up a core form from a plurality of packets of the type depicted in FIGS. 1 and 2. A portion of one of the guide flanges of the belt nester is broken away.

For building up a core form from packets such as shown at 110 in FIGS. 1 and 2, we utilize a type of wrapping machine commonly referred to as a belt nester. Referring to FIGS. 3 and 4, this belt nester, designated 128, comprises a rotatable arbor 130 that comprises a steel hub 131 having a circular outer periphery 132 and two guide flanges 134 and 136 removably attached to the hub at its respective opposite sides. Each guide flange 134 and 136 extends radially outward beyond the circular outer periphery 132 of the hub so that there is a space 137 of U-shaped cross-section present at the outer periphery of the arbor. Preferably, each of the flanges 134 and 136 is made primarily of aluminum, but each flange includes a thin sheet 138 of wear-resistant stainless steel on its inner face adhesively bonded to the remainder of the flange. As will soon be explained in more detail, a plurality of packets such as shown at 110 in FIGS. 1 and 2 are successively wrapped about the hub 131 of the arbor in the space 137 between the flanges 134 and 136 The flanges serve as guides cooperating with the lateral edges 114*e* of the packets to assure that the packets are tightly wrapped about the outer periphery 132 of the hub with their lateral edges 114*e* at each side of the packet in substantial alignment.

The wear-resistant coating 138 on each flange serves to protect the flange against wear or other damage from the sharp edges of the amorphous steel strips wrapped within space 137.

For successively wrapping the packets 110 about the hub 131 of the arbor 130, the belt nester 128 employs an endless flexible belt 140 that encircles the hub 131. This belt extends from a first point 141 on the front of the arbor about a first front roller 142, then about three idler rollers 143, 144 and 145, then about rollers 146, 147 and 148 in a belt-tensioning device 150, then about three more idler rollers 151, 152 and 153, then about a motor-driven pulley 155, and then about a second front roller 156 to a second point 158 on the front of the arbor spaced from the first point 141, and then around the hub 131 of the arbor back to the first point 141.

Each of the above described rollers 142, 143, 144, 145, 147, 151, 152, 153, and 156 is suitably mounted for free rotation about its own stationarily-located central axis. The motor-driven pulley 155 is coupled to an electric motor (not shown) through a rotatable drive shaft 157 attached to the pulley and having a stationary axis. When the motor is operated to drive the pulley, the pulley drives the belt 140 in the direction of arrows 160 (FIG. 3).

The belt-tensioning device 150 comprises a pair of rollers 146 and 148 that are mounted on a horizontally-extending cross-head 162 that is suitably guided for vertical motion and biased vertically upward by a spring device 164. Also included within the belt-tensioning device is a stationary idler roller 147. The belt 140 extends from the idler roller 145 over one of the movable rollers 146, then underneath the idler roller 147, then over the other movable roller 148 and then underneath idler roller 152. As the core form on the arbor is built up, greater effective belt length is required for the belt 140 to encircle the increasingly larger periphery of the core form; and the movable rollers 146 and 148 move downwardly against the bias of spring device 164 to make available this greater effective belt length. The spring device 164 maintains a substantially constant tension on the belt 140 as the core form is built up on the arbor.

Figure 4A:
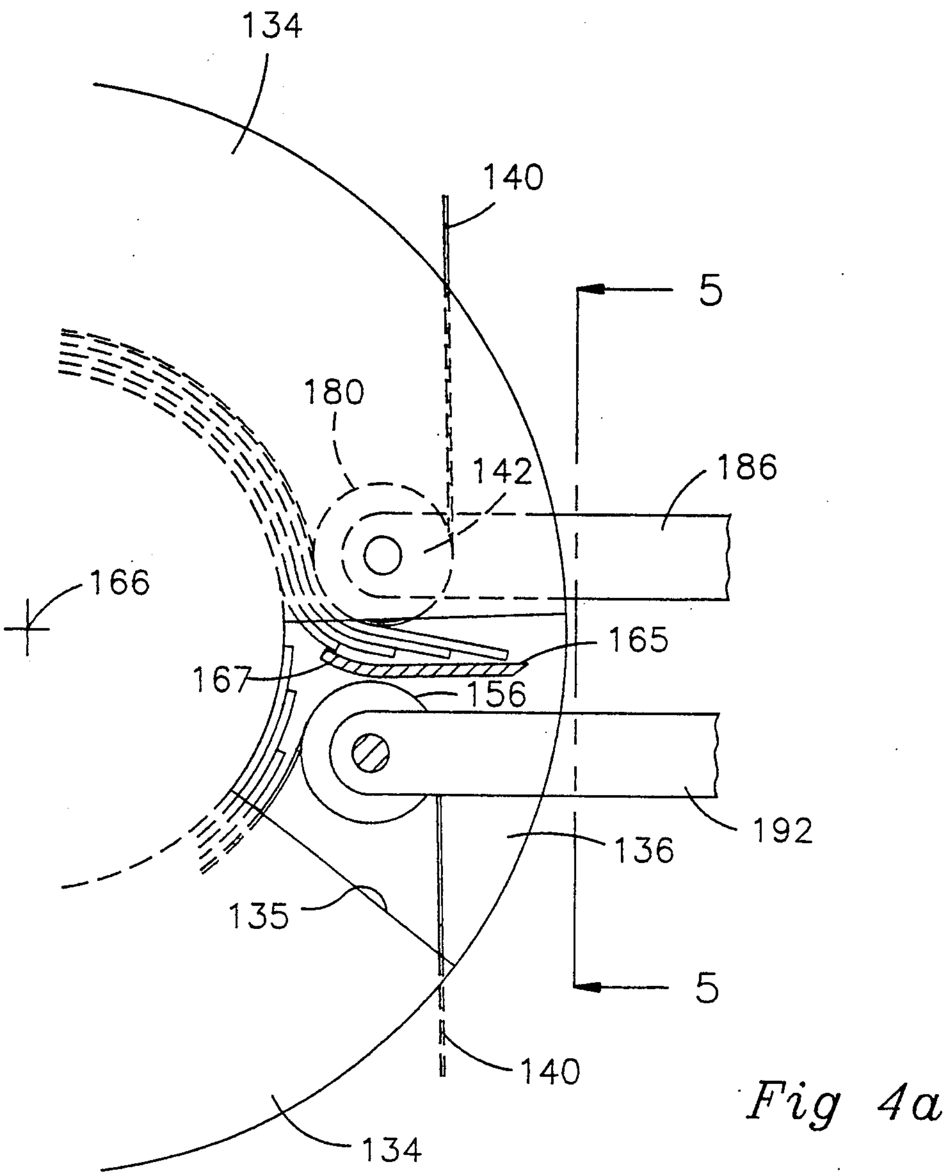
FIG. 4A is an enlarged view of a portion of FIG. 3 without any breaking away of the guide flange.
Figure 6:
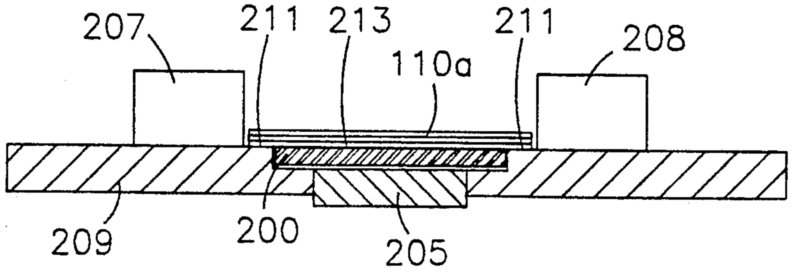
FIG. 6 is an enlarged sectional view along the line 6—6 of FIG. 3.

Each packet 110 that is to be wrapped about the arbor is fed onto the arbor hub along the upper surface of a stationary guide plate 165 that extends between the front rollers 142 and 156. As seen in FIG. 4*a*, this guide plate has a front portion 167 that is curved gradually upwardly so that the leading end of the packet entering from the right is directed upwardly into the space between the upper run of the belt 140 and the underlying peripheral portion of the hub of the arbor. When the belt fully contacts the leading end of the entering packet, the belt drive is started and the leading end of the packet is gripped between the belt and the hub (or any core form then present on the hub). As the belt moves in a counterclockwise direction about the axis 166 of the arbor, it drives the arbor counterclockwise about this axis, carrying the leading end of the packet counterclockwise about the axis 166. As the leading end of the packet moves in this manner, more and more of the remaining length of the packet enters the space between the belt and the hub and is progressively wrapped about the hub. This action continues until the trailing end of the packet is wrapped. The packet is of such length that its trailing end overlaps its leading end, thereby producing a lap joint between opposite ends of each group in the packet. The leading edge of each group that is laid down after the first (or radially-innermost) group is positioned closely adjacent the trailing edge of the immediately-preceding group. Accordingly, there are formed between the ends of each packet distributed lap joints, sometimes referred to also as step lap joints.

FIG. 3 depicts the belt nester after its arbor 130 has been rotated through almost a single revolution to almost complete wrapping of a first packet 110 about the arbor hub. A second packet is depicted at 110*a* in a position where it is in readiness to be fed into the belt nester to be wrapped about the first packet after wrapping of the first packet is completed.

The arbor must be rotated slightly more than one revolution (i.e., a short distance into a second revolution) in order to produce the desired overlap at the packet joint. To restore the arbor to a position to receive the next packet, this second revolution of the arbor is completed, and then a new packet (e.g., 110*a* of FIG. 3) is fed into the belt nester in the same manner as described above and is wrapped about the outer periphery of the immediately-preceding wrapped packet in the same manner as described above.

Additional packets are successively wrapped about the outer periphery of the core form in the same manner until a core form of the desired thickness, or build, has been developed. The additional packets that are wrapped after the first two are so positioned that their lap joints are located generally in radial alignment with the lap joints of the first two packets. The joint region of the full-thickness core has a progressively increasing length proceeding from the window to the outer periphery of the core form, just as shown in FIG. 2 of the aforesaid U.S. Pat. No. 4,741,096—Lee and Ballard.

As shown in FIG. 4A, one of the flanges (134) on the arbor has a gap or window 135 therein angularly registering with the joint region, and through this window the operator of the belt nester 128 can readily view the joint developed for each packet. If the amount of overlap in the joint is not within prescribed limits, he initiates certain adjustments in the strip-length control means (not shown) which cause the strip-length control means to appropriately adjust the length of subsequently-cut strips and thus the groups and packets assembled from such strips.

As the core form is built up on the hub 131 of the arbor, the axis 166 of the arbor is forced to move to the left, as viewed in FIG. 3, thus providing room for new packets successively fed onto the outer periphery of the core form between this outer periphery and the front roller 142. This leftward movement of the arbor axis is made possible by horizontally-extending slots 168 provided in the framework 170 that supports the arbor. The arbor has a horizontally-extending supporting shaft 172 that extends into these slots, and the slots cooperate with this shaft 172 to guide the arbor for the desired horizontal movement. The arbor is biased to the right by the belt-tensioning device 150 supplying tensioning force to the belt 140. But as additional packets 110 are fed into the belt nester 128 to increase the diameter of the core form, the arbor hub 131 is forced away from the front rollers 142 and 156, thus gradually moving horizontally to the left against the rightward bias of the belt-tension. Rightward movement of the arbor by the above-described biasing force is limited by the front rollers 142 and 156, which contact the belt 140 encircling the core form.

BELT NESTING OF DRY PACKETS

In the aforesaid application Ser. No. 07/623,265—Klappert and Houser, it is pointed out that a problem sometimes encountered with belt nesting of groups of amorphous metal strips is that during the nesting process the strips tend to slide about within the group and on the rotating arbor or on the partially built-up core form. To overcome this problem, it has been proposed to cover the strips just prior to belt nesting with a volatile liquid that is capable of holding the strips together sufficiently to permit effective belt nesting. But this approach is not entirely satisfactory because the volatile liquid is expensive, is environmentally undesirable, and can produce corrosion problems.

Figure 5:
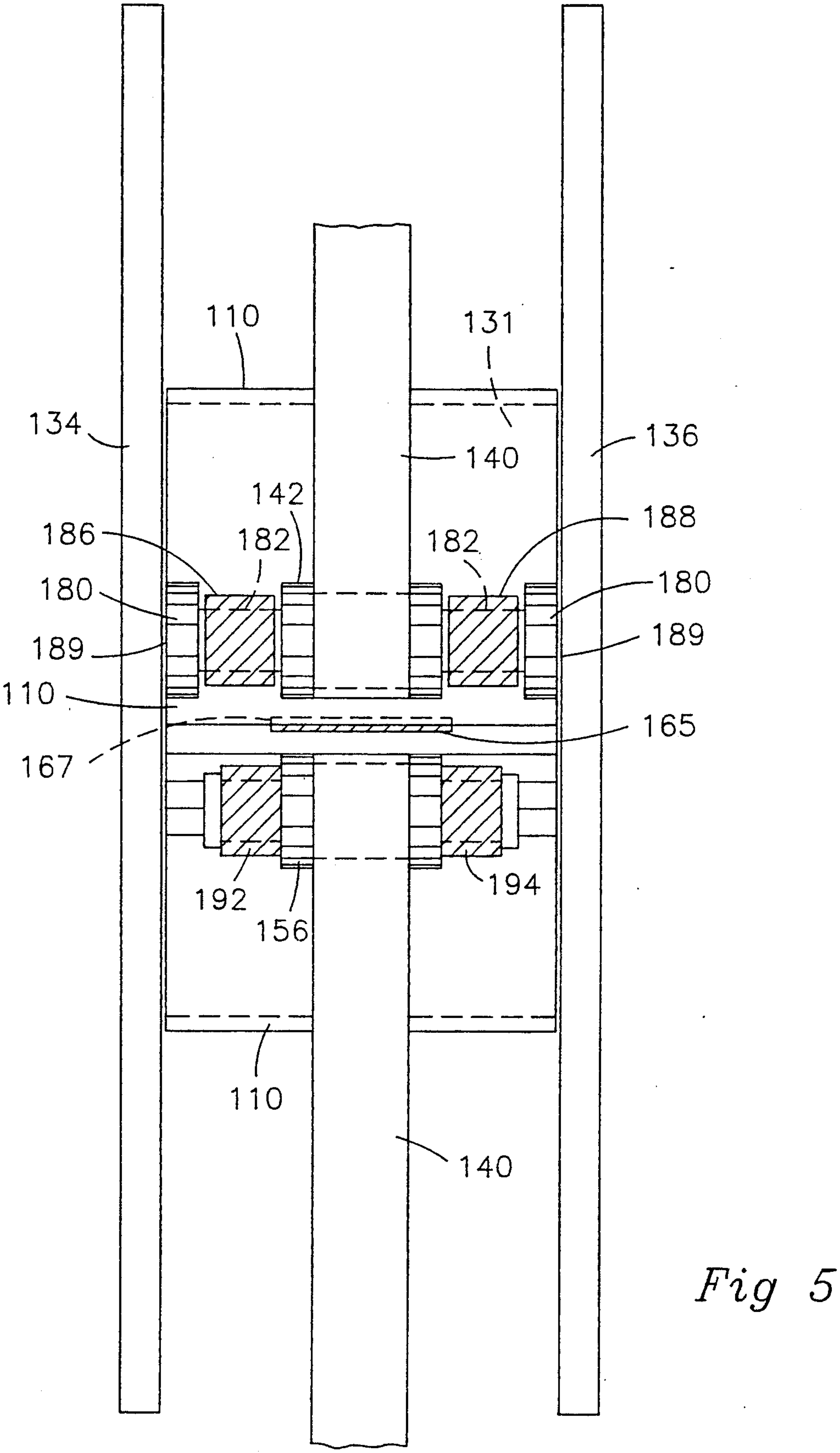
FIG. 5 is a sectional view along the line 5—5 of FIG. 4A.

Klappert and Houser are able to achieve effective belt nesting without relying upon any liquid for holding the strips together while they are being wrapped. A number of different features contribute to this capability. One, the strips are fed into the belt nester in packets having enough column strength considered laterally of the packets to enable the guide flanges 134 and 136 of the arbor to edge-guide the packets laterally and seat them in the U-shaped space 127 at the periphery of the arbor. Two, the packets are assembled from groups of strips derived through a pre-spooling process corresponding to that disclosed and claimed in application Ser. No. 505,593—Ballard and Klappert. When groups are made by this pre-spooling process, the strips in each group, even though essentially dry, adhere to juxtaposed strips almost as if a glue is present between them. Three, tight guidance is applied to the edge portions of each packet from the time it enters the belt nester underneath the upper front roller 142. In this respect, the upper front roller 142 is provided with a pair of edge-guiding infeed rollers 180 that are mounted on the same rotatable shaft 182 as the upper front roller 142, as best seen in FIG. 5. The infeed rollers 180 by bearing against the top of the packet edge-portions (and thus exerting force on these edge portions acting radially inwardly of the arbor hub), block these edge portions from curling up and rolling up the flanges 134 and 136, thus maintaining a cylindrical configuration of the core as it is built up.

THE TELESCOPING PROBLEM

Our apparatus employs all three of these features of the Klappert and Houser apparatus. Use of these features enables us to very effectively manufacture amorphous steel cores of moderate diameter (e.g., up to about 22 inches) by belt-nesting packets of amorphous steel while the packets are in a dry condition. But when this apparatus is used for manufacturing cores of larger diameter, the "telescoping" problem described hereinabove becomes more difficult to manage. Especially, when the wrapping operation nears the outer periphery of such cores, and the turn being wrapped become quite long, e.g., one hundred inches or more, there is a strong tendency for the trailing portion of some of these turns to telescope (i.e., to become displaced in a lateral direction from the leading edge) during the wrapping operation.

USING THE PRESSURE PLATE 222 TO MANAGE THE TELESCOPING PROBLEM

Figure 9:
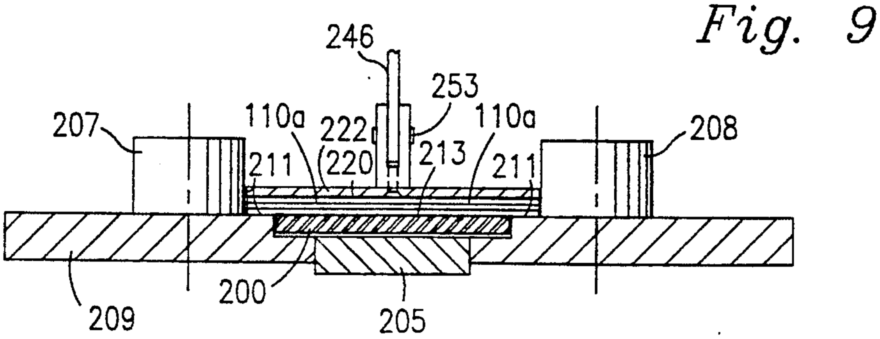
FIG. 9 is a sectional view similar to FIG. 8 but showing the pressure plate 222 in its depressed position.
Figure 10:
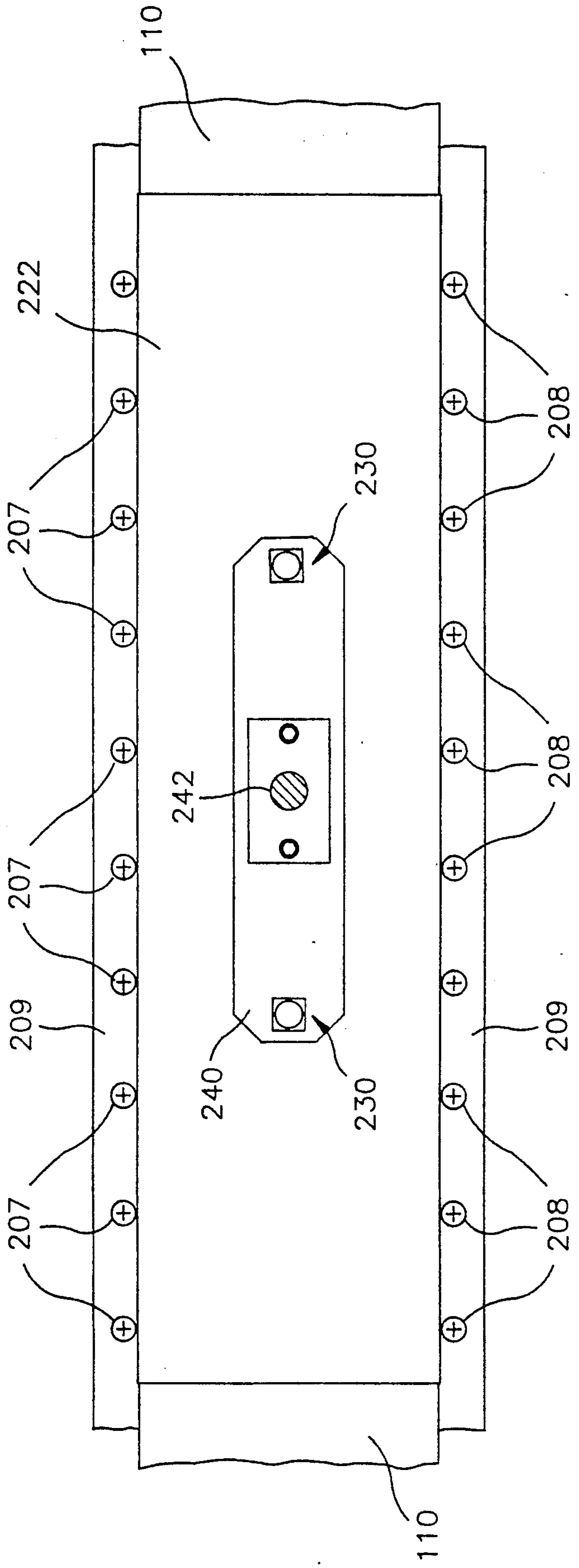
FIG. 10 is a sectional view along the line 10—10 of FIG. 7.

We are able to effectively resist the above-described telescoping tendency by providing in this apparatus a pair of flat surfaces between which the packets are lightly compressed as they are fed into the belt nester. These flat surfaces, one a lower surface and one an upper surface, are best shown in FIGS. 6–9. The lower one of these flat surfaces is constituted by the upwardly-facing surface 213 of the conveyor belt 200 and the adjacent upper surface 211 of table 209, which is coplanar with the upwardly-facing surface 213 of the belt 200. The upper surface is constituted by the downwardly-facing surface 220 of a flat pressure plate 222. The pressure plate 222 is movable in a vertical direction between its elevated position of FIGS. 7 and 8 and a depressed position, shown in FIG. 9, where it rests upon the packet 110 then present between the guides 207 and 208. The pressure plate 222 is disposed in lateral alignment with the conveyor belt 200 and, when depressed, the pressure plate fits between the horizontally-spaced guides 207 and 208, as shown in FIG. 9.

Figure 7:
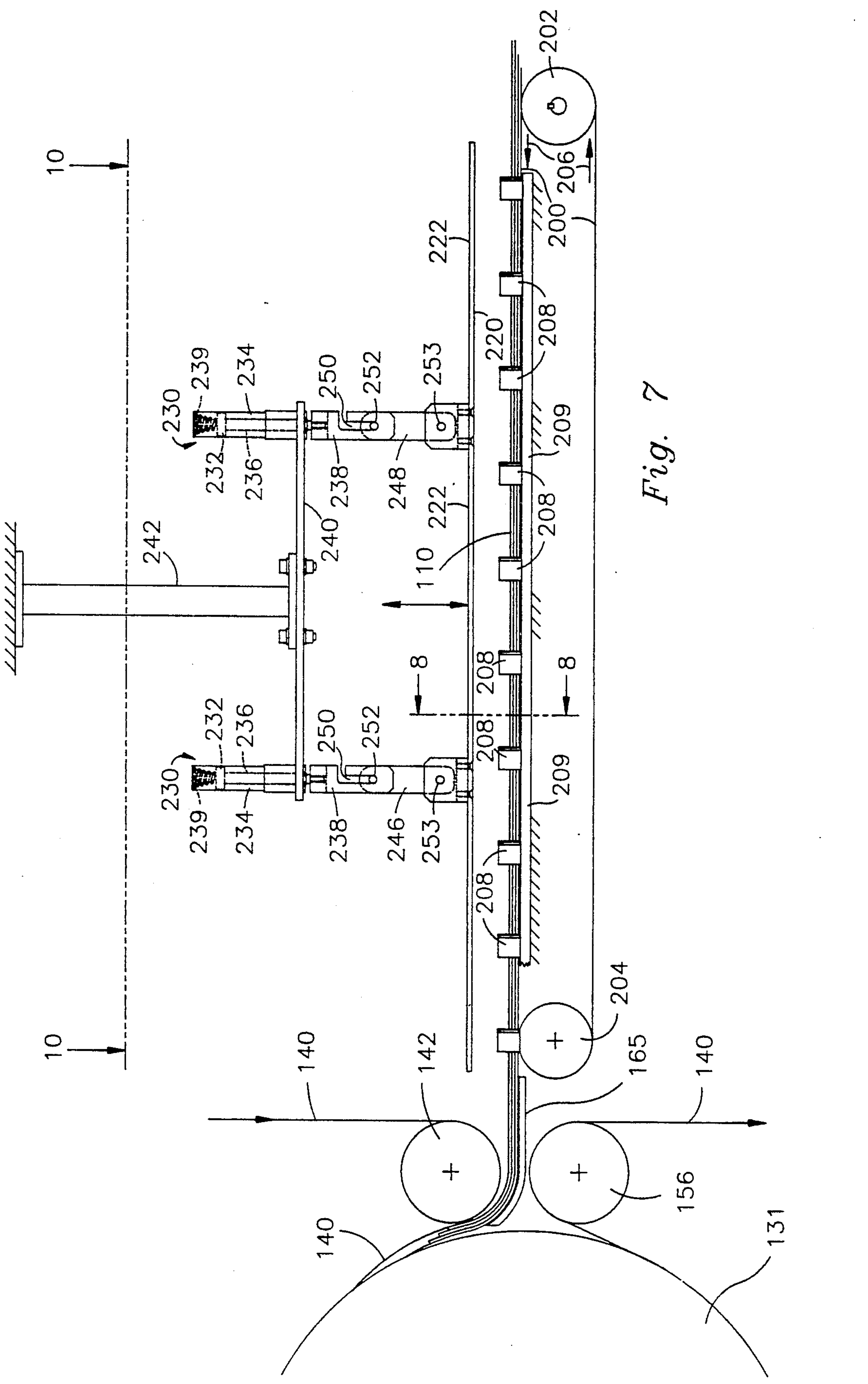
FIG. 7 is a view similar to that of FIG. 3 except showing additional details of the packet-feeding mechanism and omitting many of the details of the belt-nesting mechanism.
Figure 8:
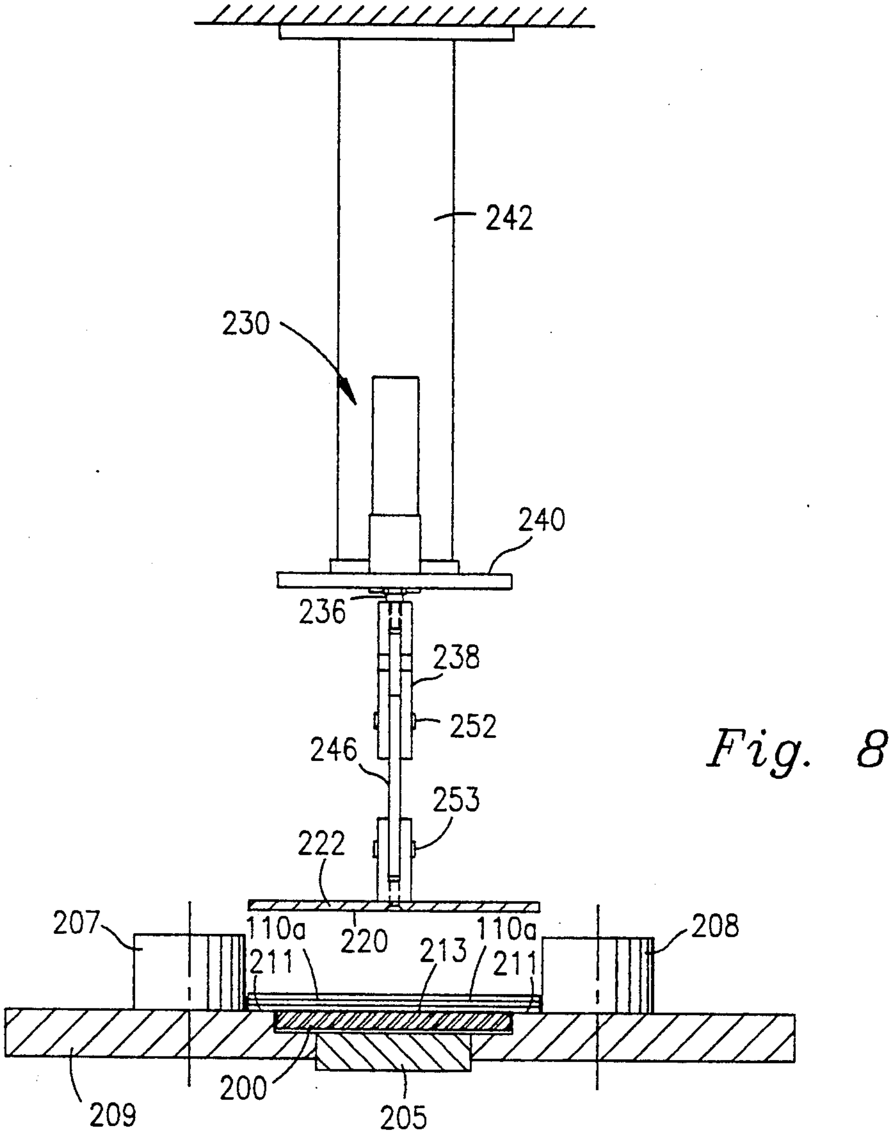
FIG. 8 is an enlarged sectional view along the line 8—8 of FIG. 7. The apparatus depicted in FIG. 8 includes a pressure plate 222 which is depicted in its elevated position.

Referring to FIG. 7, for controlling vertical motion of the pressure plate 222, a pair of horizontally-spaced fluid motors 230 are provided. Each of these fluid motors comprises a vertically-movable piston 232 and a stationary cylinder 234 in which the piston is vertically slidable. A piston rod 236 extends through a sealed opening in the lower end wall of the cylinder 234 and is mechanically coupled to a support hanger 238. When pressurized air is supplied to the space beneath each of the pistons 232, it is driven into its uppermost position (shown by dotted lines in FIG. 7), carrying the hanger 238 into its elevated position of FIG. 7. When the space beneath each of the pistons 232 is vented, a compression spring 239 above the piston forces the piston in a downward direction, thereby driving the support hanger 238 downwardly into a depressed position, allowing the pressure plate 232 to drop onto the packet that is then present beneath the pressure plate. The two fluid motors 230 are preferably arranged for substantially simultaneous operation, each being vented at the same time and each being supplied with pressurized air at the same time.

The stationary cylinders 234 are disposed at opposite ends of a stationary support plate 240, which is carried by a support post 242 fixed at its upper end to the stationary frame of the machine. The lower end of post 240 is suitably attached to the support plate 240 midway between the cylinders 234.

As seen in FIG. 7, the pressure plate 222 is supported from the horizontally-spaced support hangers 238 by two links 246 and 248 fixed to the pressure plate at spaced-apart locations along the length of the pressure plate. Each of these links 246 and 248 is connected at its upper end to one of the support hangers 238 by a slotted connection that provides a one-way drive between the support hanger 238 and the associated link 246 or 248. This slotted connection comprises a vertically-extending slot 250 in the hanger and a pin 252 slidably disposed in the slot and connected to the link 246 or 248. When the support hangers 238 are driven upwardly toward their position of FIG. 7, they are positively coupled to their associated link 246 or 248, thus driving the associated link upwardly and carrying the pressure plate 222 upwardly. On the other hand, when the support hangers 238 are driven downwardly from their positions of FIG. 7, there is no positive connection between the support hangers and their associated links. The slotted hanger moves downwardly ahead of the pin 252 in the link 246 or 248, allowing the pressure plate 222 to drop in follow-up relationship to the downwardly moving support hangers 238. The presence of the one-way connections 250, 252 results in gravity alone exerting a downward bias on the pressure plate 222 when it is resting on the packet 110. No downward force is transmitted to the pressure plate from the springs 239 in the fluid motors 230.

Referring to FIG. 7, it will be noted that the slots 250 in the support hangers are of an L-shaped configuration and have one end open. This allows the pressure plate 222 to be easily removed and replaced with another one (e.g., one having a different width for use with packets of a different width). The replacement pressure plates should, of course, have pins such as 252 located in the same positions as the pins 252 of the original in order to facilitate easy replacement. Pressure plate removal is effected by lifting the assembly comprising the pressure plate 222 and the pins 252 and shifting this assembly to the right (as seen in FIG. 7) to cause the pins 252 to exit the slots 250. A replacement pressure plate is installed by aligning the pins 252 of the replacement pressure plate with the open ends of the slots 250, moving the pins to the left, as seen in FIG. 7, and then allowing the pins to drop to the bottom of the slots 250.

It is to be noted that the pressure plate 222 is blocked from moving a substantial distance horizontally along the length of the packet 110. The joints 253 between the links 246, 248 and the pressure plate 221 are pivots allowing a slight amount of rocking of the pressure plate 222 when the pressure plate is depressed so as to facilitate easy seating of the pressure plate between the guides 207 and 208. But any substantial horizontal motion of the pressure plate would require lifting of the pressure plate, and such action is opposed by gravity. Thus, when the pressure plate is in its depressed position of FIG. 9, it remains substantially horizontally fixed while the packet 110 moves beneath it.

The pressure plate 222 is held in its elevated position of FIG. 7 until the packet that is to be wrapped is fed to the left into its central position of FIG. 7, where the left hand ends of all the strips of the packet are under the nesting belt 140 (i.e., located between the nesting belt and the hub 131 of the arbor or the wrapped core form then present on the arbor hub). At this point the pressurized air in the fluid motors 230 is vented to lower the support hangers 238, thus allowing the pressure plate 222 to drop down onto the packet 110. The pressure plate, in the region where it rests on the packet, lightly compresses the packet between the pressure plate and the flat lower surface formed by the upper surface of conveyor belt 200 and the adjacent coplanar table top 211. The compression of the packet in this region pushes the strips of the packet together and thus eliminates wrinkles in the strips of the packet in this region and also substantially eliminates air pockets between the strips in this region. As the packet is advanced to the left as viewed in FIG. 7, new regions of the packet pass beneath the pressure plate 222 where they are compressed by the pressure plate, thus removing wrinkles from the strips in these new regions and squeezing out air pockets from between the strips in these new regions. This action continues as substantially the entire length of the packet is wrapped tightly about the arbor. Referring still to FIG. 7, when this has occurred and when the right hand end of the packet has passed to the left beyond the left hand end of the pressure plate 222 (i.e., a second control position), the pressure plate is lifted into its elevated position of FIG. 7 by fluid motors 230, thereby preparing the apparatus for the next packet that is fed in by the conveyor belt 200.

The lifting and the subsequent lowering of the pressure plate 222 can be initiated manually by the operator of the machine or can be initiated automatically by sensing means (not shown) which senses the position of the packet and causes appropriate operation of the fluid motors 230 when the packet enters one of the control positions referred to in the immediately-preceding paragraph.

Compression of the packet by the pressure plate 222 blocks lateral shifting of the individual strips relative to each other as the wrapping operation proceeds, thus assuring that any contact of the lateral edges of packet with the guides 207 and 208 will take place along substantially the entire thickness of the packet rather than at the edges of a small number of laterally-projecting strips. If only a small number of the strips in each packet were allowed to contact the guides at the lateral edges of the strips, lateral guidance of the packet would be less effective and, moreover, there would be a significant likelihood that the edge regions of those laterally-projecting strips would be damaged by such contact when the packet attempted to laterally shift. But when all the laterally-aligned strips of a packet are forced together as in our apparatus, the strips act collectively like a composite solid strip having a thickness equal to their aggregate thickness. A typical packet contains 250 strips, each about 0.001 inches in thickness. Thus, when compressed as above described, the composite acts (from an edge-guidance viewpoint) in much the same manner as a solid strip 0.25 inches in thickness, at least over most of the length of the composite.

Another manner in which the pressure plate 222 contributes to increased resistance to telescoping is that in compressing the packet that is being wrapped, it introduces a drag force that in opposing the wrapping force, subjects the packet to a tensile force along its length. This tensile force lengthwise of the packet helps to prevent the packet from moving sideways against the flanges 134 and 136 and the guides 207 and 208.

In a preferred form of the invention, the pressure plate has the same width as the packet being wound, thus enabling it to exert the desired compressive force at the lateral edges of the packet. Also in a preferred form of the invention, the pressure plate is of aluminum. Other suitable materials can be used, but any that is used should have a low coefficient of friction with respect to the amorphous steel. While some friction is desirable in that it introduces the above-described desirable tensile force lengthwise of the packet, excessive friction will impede the wrapping operation and can also interact with the wrapping force to cause lengthwise shifting of some of the strips relative to each other during a wrapping operation. When an aluminum pressure plate is used, we have found that it should exert a pressure on the amorphous steel packets of about 0.025 pounds per square inch. We rely entirely upon gravity for developing this pressure, thus reducing the chances that the preset pressure will be affected by variables, such as a spring with properties affected by fatigue.

An advantage of using a pressure plate 222 that is of aluminum is that it is not magnetic, and thus the compressive pressure it exerts on the packet is not significantly affected by the magnets 205 below the top run of the conveyor belt 200. This also allows gravity alone to develop the compressive pressure exerted by pressure plate on the packet.

In a preferred form of the invention, the pressure plate 222 has a length of about $\frac{1}{3}$ to $\frac{1}{2}$ of the length of longest packets being wrapped. A length of at least this amount is desirable in order to enable the pressure plate to produce good lateral guidance of the packet.

While the lower surface 220 of the pressure plate is smooth, it is to be understood that small holes or furrows in this surface can be tolerated without defeating the ability of the pressure plate to resist telescoping and to squeeze out wrinkles in the strips and air pockets between the strips. In using the term "substantially flat" to define this surface 220, we intend to comprehend within its meaning a surface such as 220 with such holes, furrows, or similar minor irregularities that do not substantially affect these abilities of the surface. Similarly, we intend for the term "substantially flat" to have the same meaning when applied to the lower surface 211, 213.

While we have shown and described a particular embodiment of our invention, it will be obvious to those skilled in the art that various changes and modifications may be made without departing from the invention in its broader aspects; and we, therefore, intend herein to cover all such changes and modifications as fall within the true spirit and scope of our invention.

What we claim is:

1. Means for wrapping stacks of thin amorphous metal strips into a hollow transformer-core form that includes a window, comprising:

(a) an arbor located where the window is to be located and mounted for rotation about an axis of the arbor, (b) a belt wrapped about and onto a first peripheral portion of the abort so that a space is present between the belt and a second peripheral portion of the arbor, the belt having a length extending about the arbor and being movable along said length for imparting rotary motion to said arbor, (c) means for successively feeding individual ones of said stacks of metal strips into the space between said belt and said arbor for successively causing said individual stacks to be wrapped about said arbor as said belt is driven along its length, (d) means defining a first substantially flat surface upon which said stacks are supported as they are fed into the space between said belt and said arbor, (e) means defining a second substantially flat surface extending substantially parallel to said first flat surface and located so that regions of a stack pass between said two flat surfaces as the stack is fed into the space between the belt and the arbor, and (f) means operable when a stack that is being wrapped on the arbor passes between said two flat surfaces for biasing one of said flat surfaces toward the other and compressing said stack between said two flat surfaces as the stack is wrapped about said arbor, thereby removing wrinkles from the strips in the region of the stack between the two flat surfaces and removing air pockets from between said strips in said region.

2. Wrapping means as defined in claim 1 in which one of said substantially flat surfaces is blocked from substantially moving along the length of the stack passing between said two flat surfaces as the stack is compressed between said two flat surfaces.

3. Wrapping means as defined in claim 1 in which said means for biasing one of said substantially flat surfaces toward, the other exerts a force that is kept sufficiently low so that said force does not cause substantial relative lengthwise movement between the metal strips of the compressed stack as the stack is wrapped about said arbor.

4. Wrapping means as defined in claim 2 in which said means for biasing one of said substantially flat surfaces toward the other exerts a force that is kept sufficiently low so that said force does not cause substantial relative lengthwise movement between the metal strips of the compressed stack as the stack is wrapped about said arbor.

5. Wrapping means as defined in claim 1 and further comprising:

(a) a table upstream from said arbor along which said stacks are fed as they travel into the space between said belt and said arbor, (b) guides located along said table and closely adjacent the lateral edges of said stacks as the stacks are wrapped about said arbor for edge-guiding the portions of the stacks still upstream from said arbor to resist lateral shifting of the stacks and resultant telescoping within the core being wrapped.

6. The wrapping means of claim 1 in which:

(a) said arbor comprises:

(1) a rotatable hub having an outer periphery on which said stacks are wound as the arbor rotates, and (2) flanges fixed to said hub at axially-opposed sides of the hub and projecting radially outward beyond the periphery of the hub for cooperating with the longitudinally-extending edges of the stacks entering the peripheral region of said hub for forcing said entering stacks to seat upon said hub with said longitudinally-extending edges substantially aligned, (b) said wrapping means comprises two front rollers engaging said belt and guiding said belt over a path that closely envelopes said first peripheral portion of said hub or any first peripheral portion of a core form built up by stacks of metal strips wrapped on said hub periphery, said front rollers being spaced from each other by a gap and being located between said flanges, one front roller engaging said belt as the belt enters said first peripheral portion of the hub and the other front roller engaging said belt as the belt exits the first peripheral portion of said hub, and (c) said stacks are fed onto the outer periphery of said hub via a path extending through said gap and then between said hub outer periphery and said belt in the region where said belt engages said one front roller.

7. The wrapping means of claim 6 in which:

(a) each stack is characterized by a tendency of the portions thereof adjacent said longitudinally-extending edges to curl in a radially-outward direction relative to said hub as the stack passes between said belt and said hub periphery in the region of said one front roller, and (b) force directed radially inwardly of said hub is applied to an outer surface of each stack adjacent the longitudinally-extending edges of the stack as the stack passes between said belt and said hub periphery in the region of said one roller, thereby to counteract said curling tendency.

8. The wrapping means of claim 7 in which said radially-inwardly directed force of (b) claim 18 is applied through infeed rollers acting on each stack adjacent said longitudinally-extending edges of the stack.

9. The wrapping means of claim 7 in which said radially-inwardly directed force of (b) claim 18 is applied through infeed rollers coupled to said one front roller and acting on each stack adjacent said longitudinally-extending edges of the stack.

10. Means for wrapping stacks of thin amorphous metal strips into a hollow transformer-core form having a window, comprising:

(a) an arbor located where the window is to be located and mounted for rotation about an axis of the arbor, (b) a belt wrapped about and onto a first peripheral portion of the arbor so that a space is present between the belt and a second peripheral portion of the arbor, the belt having a length extending about the arbor and being movable along said length for imparting rotary motion to said arbor, (c) means for successively feeding individual ones of said stacks of metal strips into the space between said belt and said arbor for successively causing said individual stacks to be wrapped about said arbor as said belt is driven along its length, (d) compression means located upstream from said arbor through which portions of the individual stacks pass as said individual stacks are wrapped about said arbor for compressing the individual stacks as they are wrapped about said arbor by forcing together the strips forming the individual stacks in the portions of the individual stacks still positioned in said compression means located upstream from the arbor.

11. Wrapping means as defined in claim 10 and further comprising:

(a) means for disabling said compression means while a leading end of a stack is passing through said upstream location of said compression means toward said arbor, and (b) means for enabling said compression means when said leading end has reached said arbor and wrapping of the stack has been initiated, thereby compressing said stack during wrapping thereof about said arbor, and in which:

(c) said compression means, when enabled, exerts a compressive force on a stack to push together the strips of said stack and, when disabled, exerts substantially no such compressive force on said stack.

12. Wrapping means as defined in claim 10 and further comprising:

(a) a table upstream from said arbor along which said stacks are fed as they travel into the space between said belt and said arbor, and (b) guides located along said table and closely adjacent the lateral edges of said stacks as the stacks are wrapped about said arbor for edge-guiding the portions of the compressed stacks still upstream from said arbor to resist lateral shifting of the stacks and resultant telescoping within the core being formed.

13. Wrapping means as defined in claim 12 and further comprising:

(a) means for disabling said compression means while a leading end of a stack is passing through said upstream location of said compression means toward said arbor, and (b) means for enabling said compression means when said leading end has reached said arbor and wrapping of the stack has been initiated, thereby compressing said stack during wrapping thereof about said arbor, and in which:

(c) said compression means, when enabled, exerts a compressive force on a stack to push together the strips of said stack and, when disabled, exerts substantially no such compressive force on said stack.

14. The wrapping means of claim 12 in which said compression means comprises a pressure plate that is biased against individual stacks as the stacks travel through the region of said pressure plate toward said arbor.

15. The wrapping means of claim 14 in which said pressure plate has a width substantially equal to the width of the stacks that are wrapped by said wrapping means.

16. The wrapping means of claim 15 in which the distance between the guides at opposite lateral edges of a stack is substantially equal to the width of said stack.

17. The wrapping means of claim 10 in which said compression means comprises a pressure plate that is biased against individual stacks as the stacks travel through the region of said pressure plate toward said arbor.

18. The wrapping means of claim 17 in which said pressure plate has a length extending along the length of said stacks as they enter the space between said arbor and said belt, the length of said pressure plate being about $\frac{1}{3}$ to $\frac{1}{2}$ of the length of the longest stack that is wrapped by said wrapping means to form said core.

19. The wrapping means of claim 17 in which said pressure plate is biased against the stacks substantially entirely by gravity.

20. The wrapping means of claim 17 in which said pressure plate has an aluminum surface that is biased against said stacks, the pressure developed by said plate on said stacks being about 0.025 pounds per square inch.

* * * * *

UNITED STATES PATENT AND TRADEMARK OFFICE

CERTIFICATE OF CORRECTION

PATENT NO. : 5,321,883

DATED : June 21, 1994

INVENTOR(S) : W. Klappert and D.R. Freeman

It is certified that error appears in the above-identified patent and that said Letters Patent is hereby corrected as shown below:

Column 10, line 66, "abort" should read --arbor--

Column 11, line 32, after "toward" the comma (,) should be deleted.

Column 12, line 33, "18" should read --7--.

Column 12, line 37, "18" should read --7--.

Signed and Sealed this

Sixth Day of September, 1994

*Attest:*

BRUCE LEHMAN

*Attesting Officer*

*Commissioner of Patents and Trademarks*